United States Patent [19]
Chin et al.

[11] 3,894,832
[45] July 15, 1975

[54] HEAT-INPUT-CONTROLLED GAS-FIRED EQUIPMENT AND METHOD

[75] Inventors: Thomas G. Chin, El Cerrito; Ronald C. Sorensen, Berkeley, both of Calif.

[73] Assignee: Chevron Research Company, San Francisco, Calif.

[22] Filed: Oct. 1, 1973

[21] Appl. No.: 402,227

Related U.S. Application Data

[63] Continuation-in-part of Ser. No. 346,214, March 29, 1973, abandoned, which is a continuation-in-part of Ser. No. 256,287, May 24, 1972, abandoned.

[52] U.S. Cl. .................................. 431/12; 431/89
[51] Int. Cl. .............................................. F23k 5/00
[58] Field of Search ...... 431/12, 89; 137/455, 467.5

[56] References Cited
UNITED STATES PATENTS

| | | | |
|---|---|---|---|
| 2,780,414 | 2/1957 | De Heer | 431/12 |
| 2,866,602 | 12/1958 | Dailey, Jr. et al. | 431/12 X |
| 3,072,468 | 1/1963 | Stitzer | 431/12 X |
| 3,241,597 | 3/1966 | Juzi | 431/12 X |
| 3,285,320 | 11/1966 | Clark | 431/12 |
| 3,556,160 | 1/1971 | Link et al. | 431/89 X |
| 3,561,895 | 2/1971 | Michelson | 431/89 X |
| 3,734,675 | 5/1973 | Osburn | 431/12 |
| 3,749,546 | 7/1973 | Reed et al. | 431/12 X |

Primary Examiner—Charles J. Myhre
Assistant Examiner—William C. Anderson
Attorney, Agent, or Firm—G. F. Magdeburger; R. H. Davies

[57] ABSTRACT

Gas-fired equipment comprising a heater having at least one burner and a fuel gas feed line containing a main fuel gas control valve or orifice, and a control system including a compensator designed to prevent changes in heating value of a fuel gas from upsetting the heat input rate to the equipment is disclosed. The compensator is fed signals representing: (1) the pressure P of the fuel gas, and (2) the specific gravity of the fuel gas, G. The compensator then relates these signals so that the heat input rate q is maintained substantially constant in spite of variations in the fuel gas heating value. The relationship established in the compensator is $$q/k = f(P,G) \qquad (1)$$

where:
$q$ = the heat input rate,
$K$ = a flow capacity coefficient,
$P$ = a pressure in the fuel gas system, and
$G$ = the specific gravity of the fuel gas.

The function $q/K$ is maintained substantially constant by preferably varying the pressure $P$ in response to changes in the fuel gas specific gravity, $G$. Thus, for any given value of $K$ the heat input rate, $q$, to the gas-fired equipment is maintained substantially constant. By means of the present invention, upsets in process fluid temperature or heat input rate due to changes in fuel gas heating value are eliminated and more efficient operation of the equipment is maintained.

21 Claims, 6 Drawing Figures

HEAT-INPUT-CONTROLLED GAS-FIRED EQUIPMENT AND METHOD

CROSS-REFERENCE TO RELATED APPLICATIONS

This application is a continuation-in-part of our application Ser. No. 346,214, filed Mar. 29, 1973, now abandoned which in turn is a continuation-in-part of our application Ser. No. 256,287, filed May 24, 1972 now abandoned.

BACKGROUND OF THE INVENTION

1. Field of the Invention

Fuel gas utilized in refinery processes and the like is generally comprised of light hydrocarbon gases such as methane, ethane, ethylene, propane, propylene, etc., together with lesser quantities of carbon monoxide, hydrogen, and inert gases such as nitrogen and carbon dioxide. The fuel gas composition can vary greatly, depending upon the source of the fuel gas. For example, fuel gas heating value may fluctuate because variable amounts of purchased natural gas or excess butanes are being added to the fuel gas system.

When dangerous pressure buildups occur in a refinery process, gases are vented from the process to relief stacks. This often contributes to air pollution. A heating value compensator would facilitate venting relief gases, which have widely varying heating values, to the fuel gas system.

The heating value of the fuel gas may then vary considerably as a function of time.

The common control systems used to regulate fuel gas flow rates to burners used in processing equipment such as reforming furnaces, steam boilers, process heaters, reboilers, and the like, are feedback control systems which begin to respond only after an upset has occurred. Thus, significant changes in the heating value of the fuel gas must upset the gas-fired equipment before the controller takes any corrective action.

These upsets have myriad adverse effects. Among these are reduced furnace tube life and off-spec products. For example, in a steam-methane reforming furnace, the relatively minor sustained increase of 20°F in the skin temperature of the furnace tubes may reduce tube life by one-half. Additionally, overheating of a process fluid in a process heater can cause degradation and coking of the fluid.

Rapid variations in fuel gas heating value cannot be adequately handled by the relatively slow response of a conventional feedback control system simply sensing the temperature of the fluid stream leaving the heating furnace. For this reason, refinery gas streams often are sent to flares, because large variable rates of hydrogen, for example, would result in sizable temperature changes in the furnaces.

By the subject invention, variations in the heating value and any pressure variations are compensated for before the upsets can cause fluctuations in the heat input delivered to the furnace. Additionally, by use of the method and apparatus of this invention, a single control system can be used to control multiple furnaces.

PRIOR ART

Two basic approaches have been proposed to overcome the adverse effects which arise when the heating value of a fuel gas changes with time.

One approach compensates for changes in fuel gas heating value by varying the flow of air or auxiliary fuels. See U.S. Pat. Nos. 803,490; 2,866,602; 3,072,468; 3,218,049; and 3,561,895.

The other approach is to vary the fuel gas flow rate. See U.S. Pat. Nos. 1,264,985; 1,367,146; 2,780,414; and 3,285,320.

U.S. Pat. No. 3,285,320 discloses a method and apparatus for controlling the flow of fuel gas to maintain constant heat input to a furnace by flow of gas in response to changes in the specific gravity of the fuel gas. The system utilizes a conventional flow controller. There is no provision in the system for compensating for fuel gas supply pressure variations.

The use of gas specific gravity to infer fuel heating value is used in many instances. See U.S. Pat. Nos. 1,264,985; 1,367,146; and 3,285,320. See also the paper, "Natural Gas Correlations," by Zapffe appearing in Petroleum Refiner, Vol 33, No. 4, pp 142–149, April 1954 and incorporated herein by reference.

SUMMARY OF THE INVENTION

The present invention is directed to heat-input-controlled gas-fired equipment having a control system and method designed to prevent changes in heating value of a fuel gas from upsetting the heat input rate to the equipment.

The gas-fired equipment of this invention comprises a heater having at least one burner, a fuel gas feed line which may contain an inlet control valve, a main fuel gas control valve or orifice, and the control system.

The heat input rate to the equipment can be written as $$q/K = f(P,G) \qquad (1)$$

wherein
$q$ = heat input rate.
$K$ = a flow capacity coefficient.
$P$ = the pressure either upstream or downstream of the main fuel gas control valve or orifice.
$G$ = the specific gravity of the fuel gas.

Signals representing $P$ and $G$ are functionally related to $q/K$, according to the above equation, by the compensator, which then makes appropriate changes in $P$ or $G$ to maintain $q/K$ substantially constant. Preferably $P$ is adjusted in response to changes in $G$.

When K refers to the main fuel gas control valve or orifice, the pressure is measured upstream of the control valve or orifice. The heat input rate, $q$, is maintained substantially constant for any value of K, that is, for any given opening of the control valve or for any given orifice.

When K refers to the burner(s), pressure is measured downstream of the main fuel gas control valve. In this case the heat input rate is maintained substantially constant for any given set point to the compensator controller.

The method of this invention is a process for preventing upsets in the heat input rate to fuel-gas-fired equipment wherein the fuel gas fluctuates in heating value and said equipment comprises at least one burner and a fuel gas feed line containing a main fuel gas control valve or orifice, which comprises the steps of:

1. establishing a first signal representative of the specific gravity, G, of the fuel gas;
2. establishing a second signal representative of the pressure, P, in the fuel gas system;
3. functionally relating the signals representative of G and P in accordance with the Equation (1) above. The compensator responds to changes in P or G, adjusting the value of one of the quantities P or G as required to maintain substantially constant the quantity q/K in Equation (1) above.

In a specific preferred embodiment wherein critical flow is maintained through the main fuel gas control valve or orifice, the compensator solves the equation $$q/C_g = K'P_1(G+B/A) \qquad (2)$$

wherein
$q$ = heat input rate,
$C_g$ = flow coefficient for critical flow for the main fuel gas control valve or orifice,
$K'$ = a constant,
$P_1$ = pressure upstream of the main fuel gas control valve or orifice,
$G$ = specific gravity of the fuel gas,
$A$ = a constant, and
$B$ = a constant;
and adjusts $P_1$ to maintain $q/C_g$ substantially constant.

DETAILED DESCRIPTION OF THE INVENTION

DRAWINGS

Figure 1:
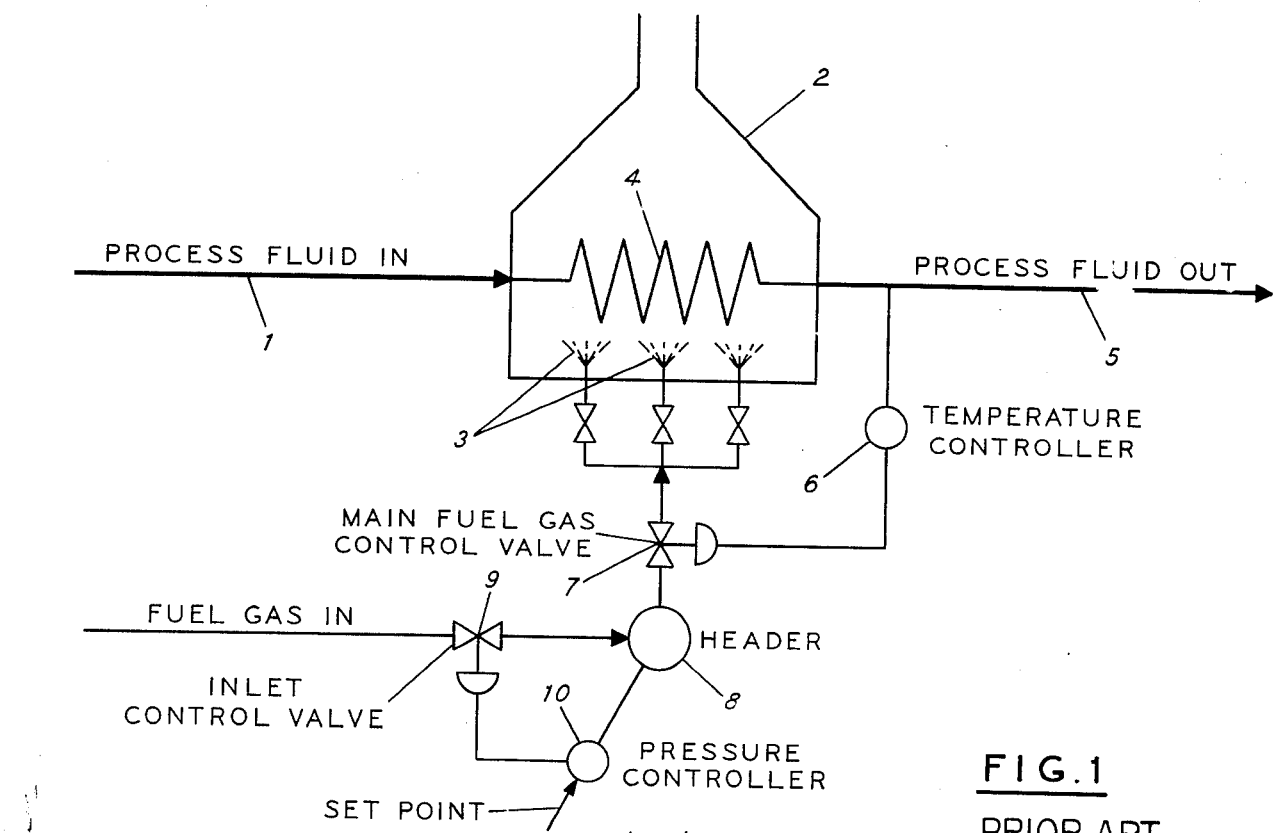

The drawings are diagrammatic illustrations of a prior art apparatus (FIG. 1) and of apparatus and flow paths suitable for carrying out preferred embodiments of the present invention (FIGS. 2–6).

STATEMENT OF THE INVENTION

In accordance with the present invention, there is provided heat-input-controlled gas-fired equipment comprising a heater having at least one burner, a fuel gas feed line which may contain an inlet control valve, a main fuel gas control valve or orifice, and the control system, whereby in the face of variability in fuel gas heating value a substantially constant heat input rate to the heater is maintained by appropriately adjusting at least one of the quantities P and G responsive to changes in at least one of the quantities P and G. That is, since $$q/K = f(P,G) \qquad (1)$$

wherein
$q$ = heat input rate,
$K$ = a flow capacity coefficient,
$P$ = the pressure either upstream or downstream of the main fuel gas control valve or orifice,
$G$ = the specific gravity of the fuel gas,
the quantity $q/K$ can be maintained substantially constant by appropriately adjusting one of the quantities $P$ and $G$ in response to changes in the other quantity. That is:

1. a first signal is established representative of the specific gravity, G;
2. a second signal is established representative of the pressure P in the fuel gas system;
3. these signals representative of G and P are functionally related in accordance with the Equation (1) above
and, responsive to changes in P or G, the value of at least one of the quantities P and G is adjusted to maintain substantially constant the quantity q/K.

The heat input rate to gas-fired heater equipment can be calculated as follows:

$$q \left[\frac{Btu}{Hr.}\right] = Q(SCFH) \times LHV \left[\frac{Btu}{SCF}\right] \qquad (3)$$

wherein
$q$ = heat input in, for instance, Btu's per hour,
$Q$ = flow rate in, for instance, standard cubic feet per hour, and
$LHV$ = fuel gas heating value in, for instance, Btu's per standard cubic foot.

A variety of equations have been developed for relating the flow of gases through control valves. Basically, the equations relate flow rate, Q, to the following variables: pressure upstream of the main fuel gas control valve, $P_1$; pressure downstream of the main fuel gas control valve, $P_2$ (for subsonic flow); temperature on an absolute scale, T; gas specific gravity, G; and a flow coefficient, C. If $$Q = f(P_1, P_2, T, G, C) \qquad (4)$$

then Equation (3) becomes $$q = f(P_1, P_2, T, G, C) \times LHV \qquad (5)$$

As used herein, the pressure referred to is absolute. However, a gauge pressure instrument can be used if calibrated so that the output signal is approximately representative of absolute pressure, even though some minor errors may arise due to variations in atmospheric pressure.

A paper entitled "The Development of a Universal Gas Sizing Equation for Control Valves," by Buresh and Schuder of Fisher Governor Company, Marshalltown, Iowa, appearing in ISA Transactions, Vol 3, No. 4, October 1964, and incorporated herein by reference, describes some of these equations.

Buresh and Schuder show that a universal equation of the following form shows excellent agreement with experimental test results:

$$Q = \sqrt{520/GT} \times C_1 C_2 C_v P_1 \sin\left[\left(\frac{3417}{C_1 C_2}\right) \sqrt{\Delta P/P_1}\right]_{deg} \qquad (6)$$

wherein Q, G, and T are as defined above, and
$P_1$ = pressure upstream of the control valve,
$\Delta P = P_1 - P_2$
$P_2$ = pressure downstream of the control valve,
$C_1 = C_g/C_v$ where $C_g$ is obtained by critical flow test as $C_g = Q_c \div P_1 \sqrt{520/T}$, wherein $Q_c$ = critical flow rate,
$C_2$ = a theoretical correction factor for the ratio of specific heats,
$C_v$ = the standard liquid sizing coefficient applicable where gas flow is essentially incompressible, i.e., $\Delta P/P_1 < 0.02$.

Where the argument of the sine function in equation 6 equals or exceeds 90°, critical flow (sonic velocity at the throat of the valve) is indicated, and the angle is limited to 90°, so the equation reduces to $$Q_c = C_1 C_2 C_v P_1 \sqrt{520/GT} \qquad (7)$$

Substituting (7) into (3) yields $$q = C_1 C_2 C_v P_1 \sqrt{520/GT} \times LHV \qquad (8)$$

But, $C_1 = C_g/C_v$;
Therefore, $$q = (C_g/C_v)C_2 C_v P_1 \sqrt{520/GT} \times LHV \qquad (9)$$

or $$q/C_g = C_2 P_1 \sqrt{520/GT} \times LHV \qquad (10)$$

If $C_2$ and T changes are negligible, then
$$q/C_g = K_1 P_1 \times LHV \div G \qquad (11)$$
wherein $K_1 =$ a constant.

It should be noted that if T varies significantly, additional instrumentation to measure these variations and allow for them can be incorporated.

Equation (11) says that for critical flow and any given $C_g$, (that is for any given main fuel gas control valve opening or any given orifice), the heat input rate is a function of three variables: upstream fuel gas pressure, $P_1$; heating value, LHV; and gas gravity, G. If the heating value can be determined from the gas gravity, the heat input rate is then a function of only two variables, vis.: The pressure upstream of the main fuel gas control valve, $P_1$; and the gas gravity, G. This relationship can be expressed as
$$q/C_g = f(P_1, G) \qquad (12)$$

In a similar manner, where critical flow is not maintained,
$$q/K = f(P_1, P_2, G) \qquad (13)$$
That is, q/K can be related to the pressure drop across the main fuel gas control valve or orifice when critical flow is not maintained, by the equation
$$q/K = f(P_1, \Delta P, G) \qquad (14)$$
wherein $\Delta P = P_1 - P_2$ as defined above [see Equation (6) above].

That is, rather than providing means for independently establishing a signal representative of $P_2$ and then subtracting $P_2$ from $P_1$, means for establishing $\Delta P$ directly can be utilized and appropriate adjustments in $P_1$, $P_2$, or G can be made to maintain $q/C_g$ substantially constant.

Equation (12) is the equation solved in one embodiment of the present invention. The fuel gas heating value compensator senses gas gravity and then the compensator controller adjusts the inlet control valve to produce the pressure $P_1$ (the pressure downstream of the inlet control valve but upstream of the main fuel gas control valve), which for any given opening of the main fuel gas control valve provides constant heat flow in spite of variations in heating value. Additionally, the compensator system prevents upsets to the gas-fired equipment due to fluctuations in gas supply pressure, in the same manner as a conventional (feedback) pressure controller would. In fact, if specific gravity is constant, the compensator system acts essentially as a pressure controller.

Considering a specific embodiment of this invention, in many real situations the expression $LHV \div G$ can be closely approximated with the linear function of G as follows:
$$LHV \div \sqrt{G} = AG + B \qquad (15)$$
wherein $A =$ a constant, and
$B =$ a constant.

If the changes in inerts concentration in the fuel gas are the dominant ones, the constants, A and B, in the correlation represented by Equation (15) will change. Since the compensator control system depends upon a one-to-one correspondence between fuel gas heating value and specific gravity, it might appear that if inert concentration changes were dominant, the compensator would be ineffective. However, we have found that the invention is effective despite changes in inerts concentration because the temperature controller, operating off the process fluid effluent stream substantially corrects for inerts changes by its feedback control loop. Thus, although the compensator depends upon a one-to-one relationship between the heating value of the gas and its specific gravity, that relationship need not be invariant with time.

Substituting Equation (15) into Equation (11) and rearranging gives:
$$q/C_g = K'P_1(G + B/A) \text{ or} \qquad (16)$$
$$q/(C_g K') = P_1(G + B/A) \qquad (17)$$
wherein $K' = K_1 A$.

Figure 3:
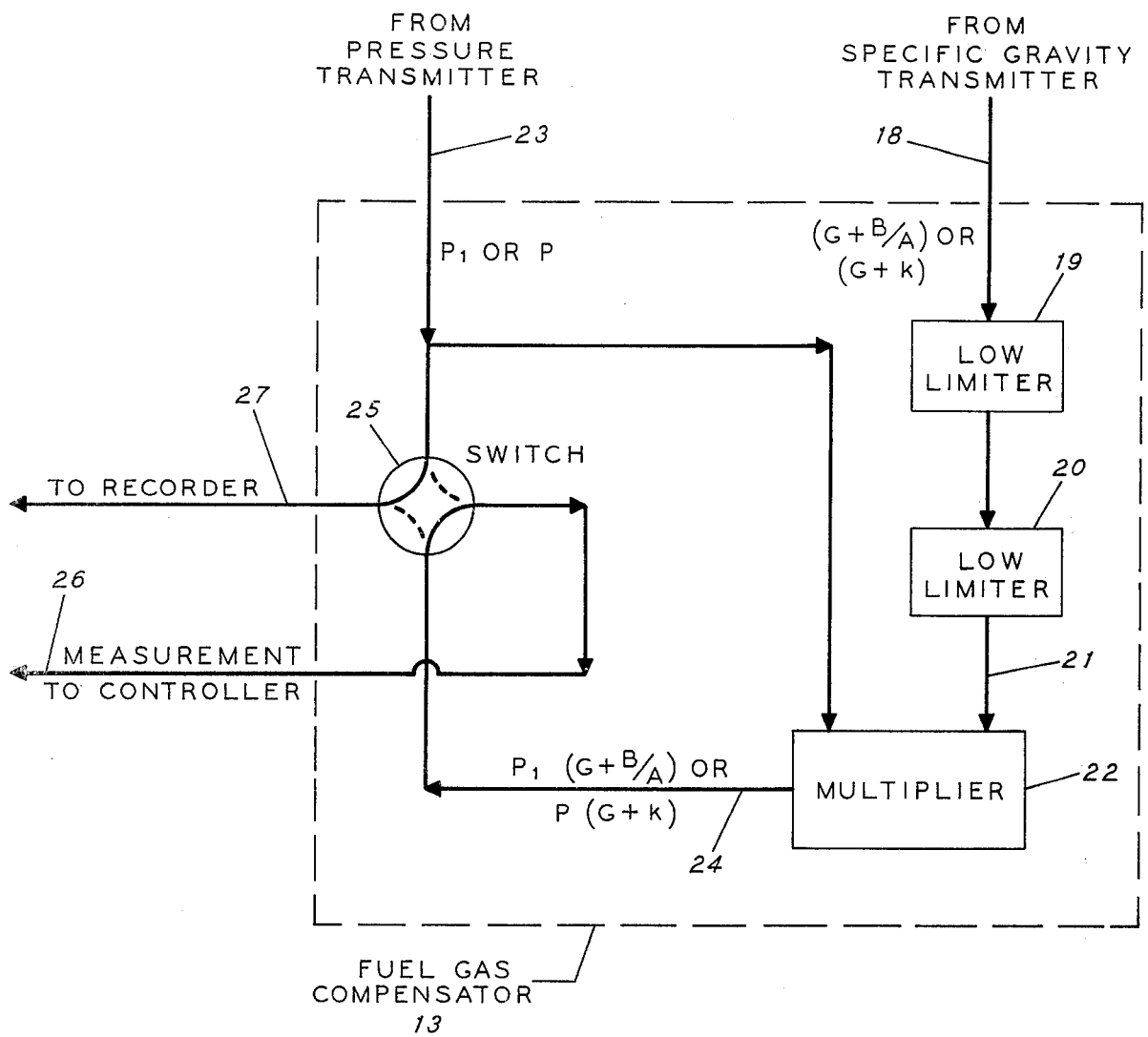
Figure 5:
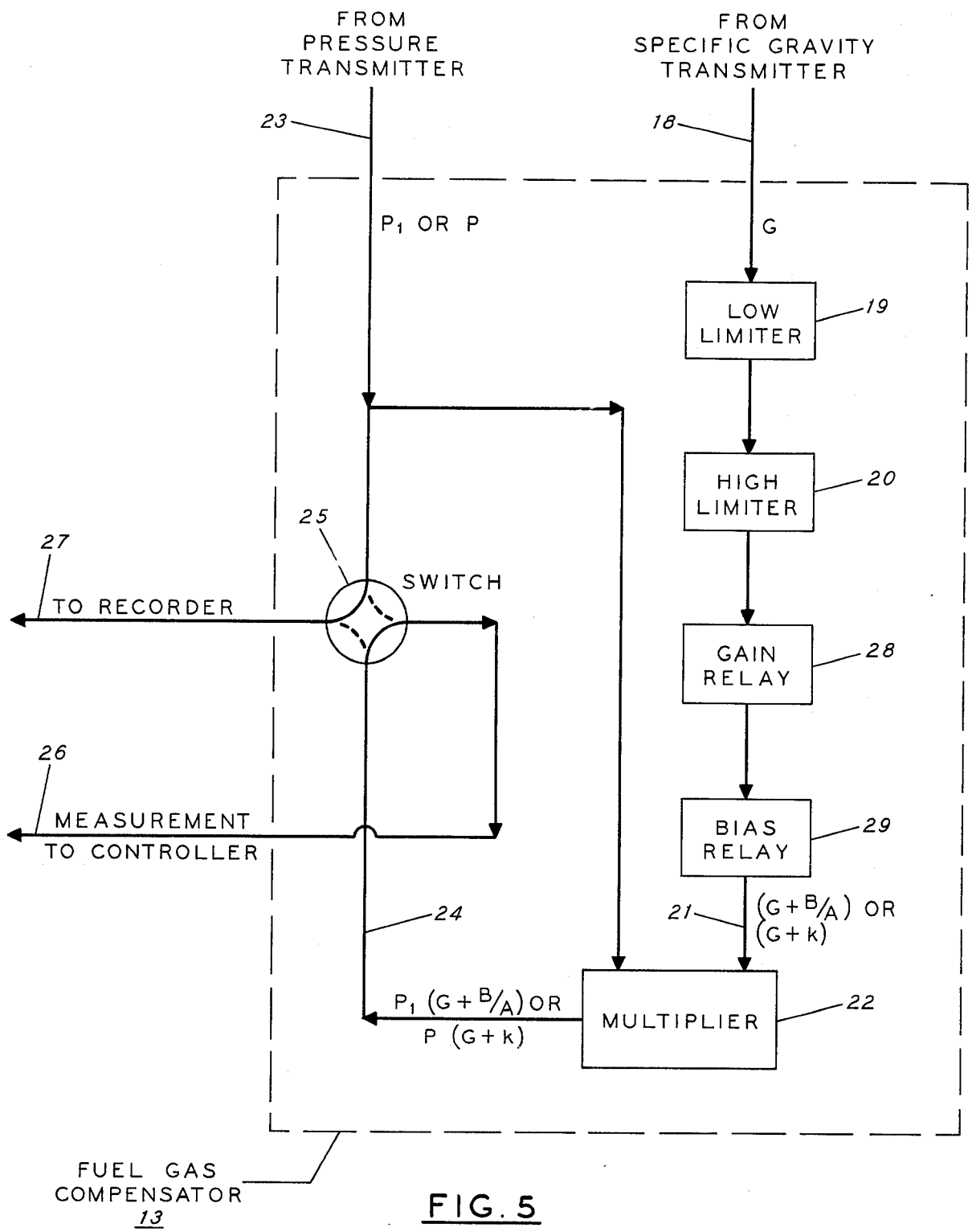

Equation (17) is solved by the compensator shown either in FIG. 3 or FIG. 5, which describes a specific embodiment of the present invention. The only difference between the compensator of FIG. 3 and the one of FIG. 5 is that in the former the compensator receives a signal representative of a G plus a constant and in the latter the compensator receives a signal representative of G alone. The constant $K'$ in this equation is simply a scaling factor.

Further, we have discovered that by properly setting the compensator and measuring P at the proper point in the fuel gas system, the compensator shown in either FIG. 3 or FIG. 5 can be utilized for the noncritical flow case as well without the necessity of measuring both upstream and downstream pressures or alternatively upstream pressure and the differential pressure, $\Delta P$. This will now be discussed in more detail.

To describe the noncritical flow case, we could use Equation (6), a generally applicable equation. However, for simplicity we shall use the following equation instead (refer to Buresh and Schuder's paper for a discussion of limitations):
$$Q = K_2 \sqrt{P \Delta P / G} \qquad (18)$$
wherein
Q = flow rate of the fuel gas in, for instance, standard cubic feet per hour,
$K_2 =$ a flow capacity coefficient,
P = the pressure either upstream $P_1$ or downstream $P_2$ of the main fuel gas control valve or orifice,
$\Delta P =$ the pressure drop either across the main fuel gas control valve ($P_1 - P_2$) or across the burner(s) and associated piping ($P_2 - P_o$), and
G = the specific gravity of the fuel gas.

Figure 2:
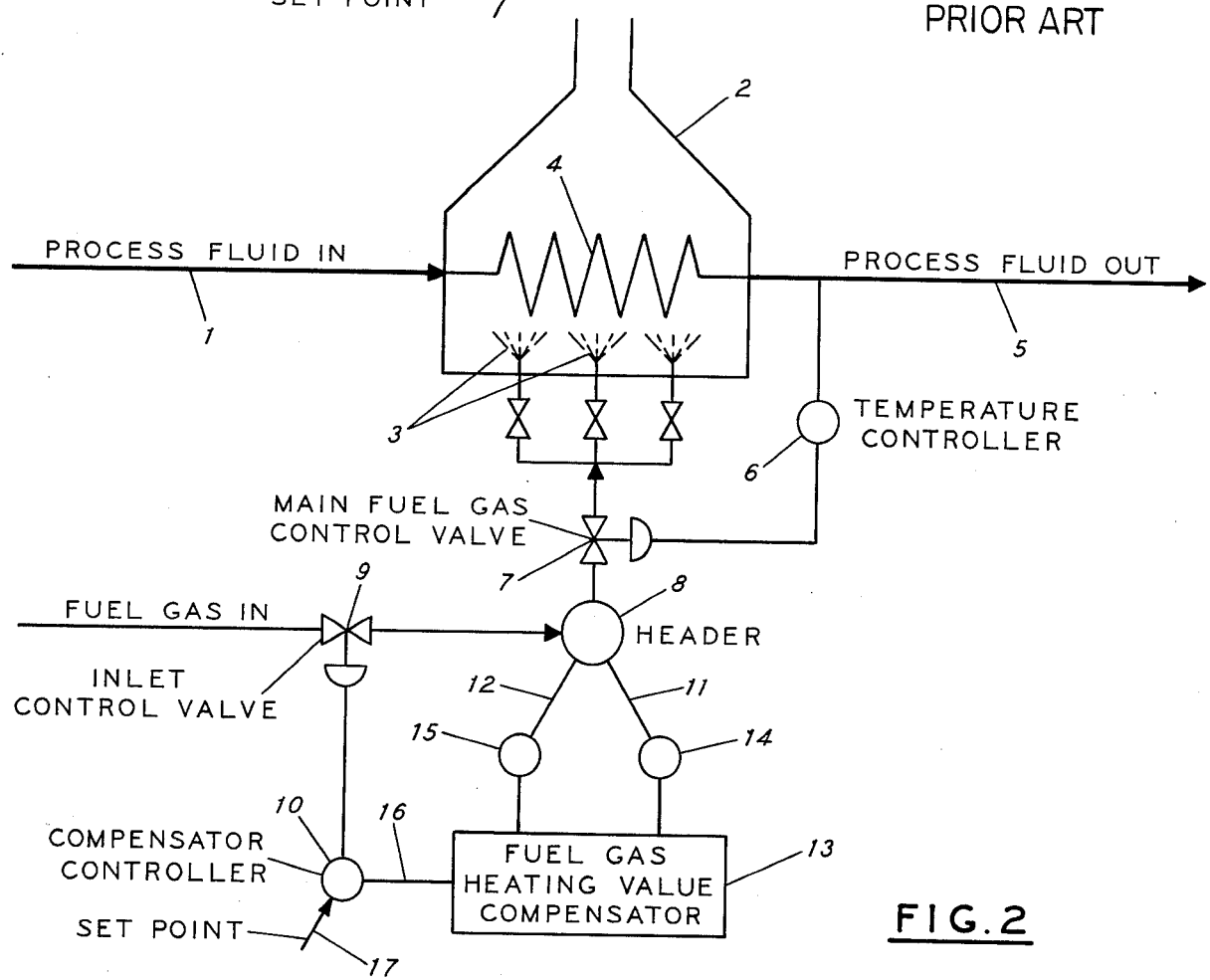
Figure 4:
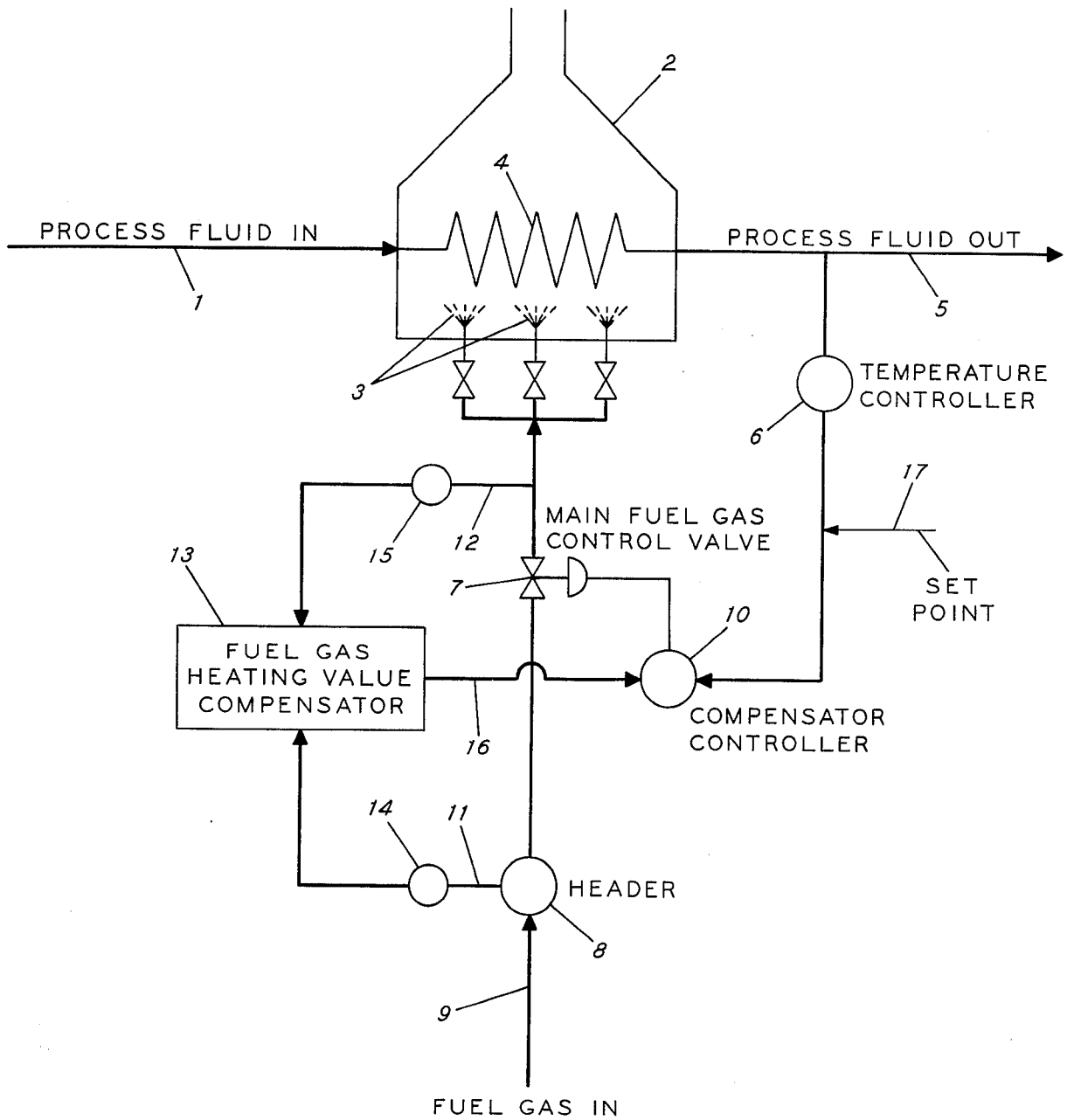

Two configurations, FIG. 2 and FIG. 4, are possible. In FIG. 2, the pressure, $P_1$, is measured upstream of the main fuel gas control valve or orifice; the pressure drop, $P_1 - P_2$, and the flow capacity coefficient, $K_2$, refer to the main fuel gas control valve or orifice. In FIG. 4, the pressure, $P_2$, is measured downstream of the main fuel gas control valve or orifice; the pressure drop, ($P_2 - P_o$), and flow capacity coefficient, $K_2$, refer to the burner(s) and associated piping with $P_o$ being the pressure in the heater.

Further, the heating value of the fuel gas can be related to the specific gravity of the fuel gas as follows:
$$LHV = a_1 G + a_2 \qquad (19)$$
We have found that the same compensator mentioned earlier (FIG. 3 or FIG. 5) can be used if generalized to solve the following equation:
$$C = P(G + k) \qquad (20)$$
where C is the set point of the compensator controller. Note particularly that B/A of Equation (17) has been replaced by the adjustable constant, $k$. The value of $k$ for a particular application can be determined experimentally after the compensator has been installed or analytically, as shown below.

Using Equations (18), (19), and (20) in Equation (3) for the case where $K_2$ refers to the burner(s) yields (note that for this case, $P_2$ is used for P and $P_2 - P_o$ is used for $\Delta P$):

$$q = K_2 \sqrt{\frac{C}{[G+k]} \left[\frac{C}{G+k} - P_o\right] \frac{a_1G+a_2}{\sqrt{G}}} \quad (21)$$

The proper value for $k$ is the value such that for small changes in G, no change in the heat input rate q results. That is, the value for $k$ must be found such that:

$$dq/dG = 0 \quad (22)$$

Setting the derivative of Equation (21) to zero and solving for $k$ gives after substituting $P_2$ from Equation (20) for the quantity $C/(G+k)$ $$k = \frac{G(a_1G+a_2)}{(a_1G-a_2)} \frac{(2P_2 - P_o)}{(P_2 - P_o)} - G \quad (23)$$

Thus, to determine $k$ all that is needed is G, $P_2$, and $P_o$ at the normal operating point and the heating value correlation parameters, $a_1$ and $a_2$.

DESCRIPTION OF THE INVENTION WITH REFERENCE TO THE DRAWINGS

Referring now to the drawings, FIG. 1 shows a typical prior art process heater furnace. Process fluid to be heated is introduced via line 1 at a temperature $T_1$ into process heater 2. Burners 3 in the heater facilitate combustion which heats the process fluid in heater tube 4. The process fluid, after being heated, flows out of process heater 2 via line 5 at a temperature $T_2$. The process fluid is then introduced into additional processing steps. These processing steps form no part of the present invention and will not be further discussed herein. Note in FIG. 1 and subsequent figures the label "header 8" refers to a header or alternatively to the fuel gas piping, in the absence of a header.

The temperature of the process fluid in line 5 is determined by suitable sensor means, such as a thermocouple, and a signal is relayed to temperature controller 6, which adjusts main fuel gas control valve 7 to either increase or decrease the flow rate of the fuel gas to the burners, depending upon whether $T_2$ is too low or too high, respectively. A pressure control loop is maintained between header 8 and inlet control valve 9. When the setting of main fuel gas control valve 7 is changed by the temperature controller to compensate for changes in the process fluid temperature in line 5, pressure controller 10 correspondingly changes the valve opening of inlet control valve 9, thereby maintaining fuel pressure in header 8 at a predetermined value $P_1$, determined by a set point. This temperature control system does not provide the rapid response to changes in fuel gas heating value required to avoid upsetting the temperature of the fluid in line 5, since it is a feedback control system and can respond only after the upset has occurred. However, when the upset occurs slowly enough, the feedback control system can satisfactorily respond to the change.

It should be noted that the main fuel gas control valve need not be controlled by a temperature controller operating off the process fluid outlet temperature. For example, if the main fuel gas control valve can be held at a specified opening by a manual loading station or if adjustments need not be made, a fixed orifice can be used.

However, when changes in the fuel gas heating value are rapid, a fuel gas heating value compensator system such as described in FIG. 2 can be used.

In the particular embodiment of the present invention shown in FIG. 2, the elements numbered as in FIG. 1 are also present. Specific gravity sensor 11 and pressure sensor 12 are connected to header 8. Signals generated by these sensors are transmitted to fuel gas heating value compensator 13 by specific gravity transmitter 14 and pressure transmitter 15, respectively. Fuel gas heating value compensator 13 generates an output signal representative of the function set forth in Equation (17) or Equation (20) above. The signal from fuel gas heating value compensator 13 is fed via line 16 to controller 10, which makes appropriate changes in the opening of inlet control valve 9, such that set point 17 equals the signal from compensator 13. The same temperature controller 6 shown in FIG. 1 is used in the present invention as exemplified in FIG. 2. This feedback control system can substantially correct for changes in inerts and for other upsets not caused by upsets in the fuel gas, such as process fluid flow rate, process fluid inlet temperature, etc.

Figure 6:
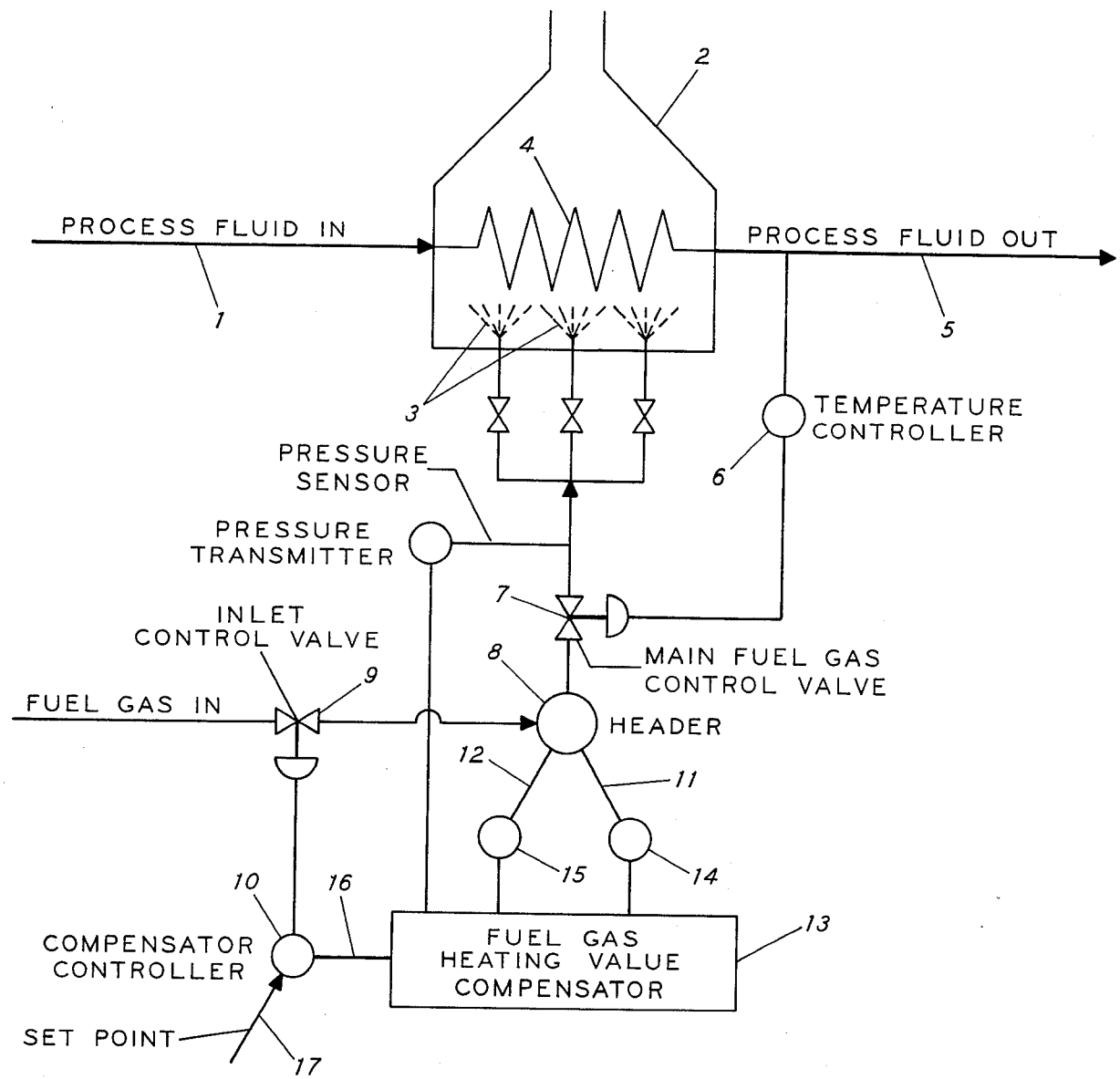

The apparatus described in FIG. 2 can be modified as shown by FIG. 6 by the addition of a pressure sensor and pressure transmitter to establish a signal representative of the pressure downstream of the main fuel gas control valve 7 which signal is then fed to the fuel gas heating value compensator 13 along with the signals generated by the specific gravity sensor 11 and pressure sensor 12. These three signals are then functionally related in accordance with the equation $q/K = f(P_1, P_2, G)$, (see Equation 13).

Referring now to FIG. 4, a configuration is shown wherein pressure is measured downstream of the main fuel gas control valve and no inlet control valve is present. Specific gravity sensor 11 is connected to header 8. Pressure sensor 12 is connected downstream of the main fuel gas valve 7. Signals generated by these sensors are transmitted to fuel gas heating valve compensator 13 by specific gravity transmitter 14, and pressure transmitter 15, respectively. Fuel gas heating value compensator 13 establishes an output signal representative of the function set forth in Equation (20) above. The signal from fuel gas heating value compensator 13 is fed via line 16 to controller 10, which makes appropriate changes in the opening of main fuel gas control valve 7, such that the signal from the compensator 13 equals the set point signal 17. The set point of controller 10 is automatically set by temperature controller 6.

FIG. 3 gives details of a specific embodiment of the fuel gas heating value compensator based on either Equation (17) or Equation (20). Thus, 13 in FIG. 3 is a specific embodiment of 13 in FIG. 2. The specific gravity transmitter is calibrated such that signal 18 from it represents the term (G+B/A), or (G+k). For protection against failure of the specific gravity transmitter, this signal is sent first to low limiter 19, and then to high limiter 20. The low limiter prevents signal 18 from dropping below a selected minimum value. The high limiter prevents signal 18 from exceeding a selected maximum value. Signal 21, which goes to multiplier 22, is equal to signal 18, provided signal 18 is less than the high limiter set point and greater than the low limiter set point. Signal 21 is equal to the low limiter set point, if signal 18 is less than the low limiter set point. Similarly, signal 21 is equal to the high limiter set point, if signal 18 is greater than the high limiter set point.

Signal 23 from the pressure transmitter is representative of pressure P or $P_1$. Given the two inputs representing $P_1$ and (G+B/A) or P and (G+k), multiplier 22 generates signal 24, which represents the product $P_1(G+B/A)$ or $P(G+k)$.

Output 24 from multiplier 22 and signal 23 from the pressure transmitter go to four-way switch 25. The purpose of this switch 25 is to allow the operator to switch from "compensator control" back to simple pressure control (as shown in FIG. 1) in the event of any failure of the compensator components or system. Normal ("compensator control") signal flow in switch 25 is shown by continuous lines. Dashed lines represent signal flow when operating on simple pressure control. Thus, normally signal 24 is sent via signal 26 to the controller (10 in FIG. 2 or FIG. 4). Pressure signal 23 is sent via signal 27 to a recorder for its informational value. When operating on simple pressure control, pressure signal 23 is sent via signal 26 to the controller and multiplier output signal 24 is sent via signal 27 to the recorder.

FIG. 5 gives details of another specific embodiment of the fuel gas heating value compensator. Thus, 13 in FIG. 5 is a specific embodiment of 13 in FIG. 2 or of 13 in FIG. 4. It differs from the fuel gas compensator of FIG. 3 in the following respects. In FIG. 5 signal 18 from the specific gravity transmitter is representative of G rather than $(G + B/A)$ or $(G+k)$. The signal representing $(G + B/A)$ or $(G+k)$ in the more general case, is generated within the fuel gas compensator 13 by gain relay 28 and bias relay 29.

This invention will be better understood by reference to the following examples, which are offered by way of illustration and not by way of limitation.

2. Fuel gas: LHV vs. G LHV = 1410 G + 10 Refer to Eq. 19

$$\text{or } \frac{LHV}{\sqrt{G}} = 834.0988226\, G + 607.7737472$$

where $G_o = 0.7$ Refer to Eq. 15

3. Fuel gas heating value compensator $$\text{"Const."} = \frac{q}{Cg\, K'} = P_1\, (G + 0.7286591597)$$

where $K' = 834.0988226$ Refer to Eq. 17

Note: "Const." is the set point of the compensator controller. Calculated Performance of fuel gas heating value comp. evaluate Const.

Const. = $P_1$ (G + 0.7286591597)
Const. = 60 (0.7 + 0.7286591597)
Const. = 85.7195496 thus $$P_1 = \frac{85.7195496}{(G + 0.7286591597)} \quad \text{Eq. A}$$

This equation shows how the compensator changes $P_1$ in response to changes in G.

Summary of Performance Calculations

| Upset No. | Cg | G | LHV (Equ 19) | WITHOUT COMPENSATOR | | WITH COMPENSATOR | |
|---|---|---|---|---|---|---|---|
| | | | | $P_1$, PSIA | q, BTU/Hr. (Equ 11) | $P_1$, PSIA (Equ A) | q, BTU/Hr. (Equ 11) |
| O Initial Operation | 2,500 | 0.7 | 997 | 60.0 | 178,746,4385. | 60.0 | 178,746,4385. |
| 1 | 2,500 | 0.8 | 1138 | 60.0 | 190,848,4019. | 56.07499163 | 178,363,7090. |
| 2 | 2,500 | 0.9 | 1279 | 60.0 | 202,227,6563. | 52.63197586 | 177,394,0188. |
| 3 | 2,500 | 0.6 | 856 | 60.0 | 165,763,6872. | 64.51583083 | 178,239,7000. |
| 4 | 2,500 | 0.5 | 715 | 60.0 | 151,674,4046. | 69.76674442 | 176,363,8237. |

EXAMPLE 1

This example is of a two-valve system with critical flow through the main fuel gas control valve (see FIG. 2).

SUMMARY OF CONDITIONS

Initial Pressure, $P_{1_o} = 60$ psia
Initial Gravity, $G_o = 0.7$
Initial Heating Value, $LHV_o = 997$ BTU/SCF
Flow Coefficient, $Cg_o = 2,500$

EQUATIONS

1. Actual heat input rate $$q = \frac{Cg\, P_1\, LHV}{\sqrt{G}} \quad (K_1 = 1.0) \quad \text{Refer to Eq. 11}$$

By comparing the results with and without the compensator for Upset No. 4, the dramatically improved results obtained using the subject invention are readily apparent. That is, without the compensator the error is about 15.2%; with the compensator it is about 1.3%.

EXAMPLE 2

This example is of a one-valve system with noncritical flow through the burners and associated piping (see FIG. 4).

SUMMARY OF CONDITIONS

Initial Pressure, $P_{2_o} = 44.0$ psia
Initial Pressure, $P_{o_o} = 14.5$ psia
Initial Gravity, $G_o = 0.7$
Initial Heating Value, $LHV_o = 1127$ BTU/SCF
Burner and Assoc. Piping Flow Capac. Coeff., $K_{2_o} = 3,290$.

EQUATIONS

1. Actual heat input rate
$q = Q \times LHV$      Refer to Eq. 3

2. Fuel gas flow rate $$Q = 3,290 \sqrt{\frac{P_2(P_2-14.5)}{G}}$$    Refer to Eq. 18

(Distributed Resistance)

3. Fuel gas: LHV vs. G      Refer to Eq. 19

$LHV = 1410\ G + 140$

4. Fuel gas heating value compensator
$C = P_2\ (G + k)$      Refer to Eq. 20

$k$ is determined from Equ 23

$$k = \frac{G\ (a_1G+a_2)(2P_2-P_o)}{(a_1G-a_2)(P_2-P_o)} - G$$

$$k = \frac{0.7(1410(0.7)+140)(2(44)-14.5)}{(1410(0.7)-140)(44-14.5)} - 0.7$$

$k = 1.620619134$

Calculated Performance of fuel gas heating value comp. evaluate C
$C = P_2\ (G + k) = 44\ (0.7 + 1.620619134)$
$C = 102.1072419$
thus $$P_2 = \frac{102.1072419}{(G + 1.620619134)}$$    Eq. B This equation shows how the compensator changes $P_2$ in response to changes in G.

Initial Valve Flow Coefficient, $K_{2_0} = 5,000$.
Burner and Assoc. Piping Flow Coefficient $K_{2_{B+P_0}} = 3,669.317686$

EQUATIONS

1. Actual heat input rate
$q = Q \times LHV$      Refer to Eq. 3

2. Fuel gas flow rate (thru main f.g. control valve)

$$Q = 5,000 \sqrt{\frac{P_1(P_1-P_2)}{G}}$$    Refer to Eq. 18

3. Fuel gas: LHV vs. G
$LHV = 1410\ G + 140$      Refer to Eq. 19

4. Fuel gas heating value compensator
$C = P_1\ (G + k)$
By trial and error, $k = 1.4$ 5. Fuel gas flow rate (thru burner(s) and associated piping).

$$Q = 3,669.317686 \sqrt{\frac{P_2\ (P_2-14.5)}{G}}$$    Eq. C (Distributed Resistance)

Using Equ. 18, find expression for $P_2$ in terms of $P_1$ and G:

$$5,000 \sqrt{\frac{P_1\ (P_1-P_2)}{G}} = 3,669.317686 \sqrt{\frac{P_2\ (P_2-14.5)}{G}}$$

Summary of Performance Calculations

| Upset No. | $K_2$ | G | LHV | WITHOUT COMPENSATOR | | WITH COMPENSATOR | |
|---|---|---|---|---|---|---|---|
| | | | | $P_2$, PSIA | q, BTU/HR. (Equations 3 and 18) | $P_2$, PSIA (Equation B) | q, BTU/HR. (Equations 3 and 18) |
| 0 Initial Operation | 3,290 | 0.7 | 1127 | 44.0 | 159,664,4173. | 44.0 | 159,664,4173. |
| 1 | 3,290 | 0.8 | 1268 | 44.0 | 168,038,0002. | 42.18228323 | 159,380,8555. |
| 2 | 3,290 | 0.9 | 1409 | 44.0 | 176,044,7114. | 40.50879426 | 158,606,2891. |
| 3 | 3,290 | 0.6 | 986 | 44.0 | 150,880,9931. | 45.98142938 | 159,336,6357. |
| 4 | 3,290 | 0.5 | 845 | 44.0 | 141,646,2076. | 48.14973149 | 158,254,2350. |

By comparing the results with and without the compensator for Upset No. 4, the dramatically improved results obtained using the subject invention are readily apparent. That is, without the compensator the error is about 11.3%; with the compensator it is about 0.9%.

EXAMPLE 3

This example is of a two-valve system with noncritical flow through (1) the main fuel gas control valve and (2) the burners and associated piping (see FIG. 2).

SUMMARY OF CONDITIONS

Initial Pressure, $P_{0_0} = 14.5$ psia
Initial Pressure, $P_{1_0} = 55$ psia
Initial Pressure, $P_{2_0} = 43$ psia
Initial Gravity, $G_o = 0.7$
Initial Heating Value, $LHV_o = 1127$ BTU/SCF Squaring both sides (after dividing by 1000)
$25.0\ P_1\ (P_1-P_2) = 13.46389228\ (P_2\ (P_2-14.5))$
$P_2^2 + (1.856818183\ P_1-14.5)\ P_2 - 1.856818183\ P_1^2 = 0$ $$P_2 = 14.5 - 1.856818183\ P_1 +$$

$$\sqrt{\frac{(1.856818183\ P_1-145.5)^2 + 4(1.856818183 P_1^2)}{2}}$$

Calculated Performance of fuel gas heating value compensator evaluate C
$C = 55\ (0.7 + 1.4) = 115.5$
thus $$P_1 = \frac{115.5}{(G+1.4)} \qquad \text{Eq. } E$$

This equation shows how the compensator changes $P_1$ in response to changes in G.

Summary of Performance Calculations

| Upset No. | $K_2$ | $\frac{K_2}{B+P}$ | G | LHV | $P_1$ | WITHOUT COMPENSATOR $P_2$ (Equ D) | q (Equations 3 and 18) | WITH COMPENSATOR $P_1$ (Equ E) | $P_2$ (Equ D) | q (Equations 3 and 18) |
|---|---|---|---|---|---|---|---|---|---|---|
| 0 Initial Operation | 5,000 | 3,669.317686 | 0.7 | 1127 | 55 | 43 | 173,028,1914. | 55 | 43 | 173,028,1913. |
| 1 | 5,000 | " | 0.8 | 1268 | 55 | 43 | 182,102,6359. | 52.5 | 41.21 | 172,578,5294. |
| 2 | 5,000 | " | 0.9 | 1409 | 55 | 43 | 190,779,5019. | 50.22 | 39.575 | 171,674,6498. |
| 3 | 5,000 | " | 0.6 | 986 | 55 | 43 | 163,509,6021. | 57.75 | 44.97 | 172,900,4091. |
| 4 | 5,000 | " | 0.5 | 845 | 55 | 43 | 153,501,8730. | 60.79 | 47.15 | 172,046,4756. |

By comparing the results with and without the compensator for Upset No. 4, the dramatically improved results obtained using the subject invention are readily apparent. That is, without the compensator the error is about 11.3%; with the compensator it is about 0.6%.

Another embodiment of the present invention contemplates the use of a digital computer to solve the equation $q/K = f(P,G)$. The computer samples the variables in the function periodically and sends the output via appropriate sample-and-hold equipment to controller 10, which adjusts the appropriate control valve to make the signal from the compensator equal to the set point. The computer can also be programmed to perform the functions of controller 10, in which case the output of the computer goes via sample-and-hold equipment directly to the control valve.

It is apparent that many widely differing embodiments of the invention may be made without departing from the scope and spirit thereof. For instance, the general concept can be used to control any property which can be related to the pressure and specific gravity of the system, e.g., mass flow rate. Further, if a suitable on-line direct heating value analyzer is available, the subject automatic control system can be used to even more accurately maintain the heat input rate at desired levels by replacing the specific gravity transmitter. Therefore, the invention is not intended to be limited except as indicated in the appended claims.

What is claimed is:

1. A method for preventing upsets in heat input rate to fuel gas-fired equipment wherein the fuel gas fluctuates in heating value and said equipment comprises a burner and a fuel gas feed line containing a main fuel gas control valve or orifice wherein critical flow is maintained, which comprises adjusting the value of at least $P_1$ and as required to maintain substantially constant the quantity $q/K$ in the equation $$q/K = f(P_1,G)$$

Wherein $q$ = heat input rate,
$K$ = main fuel gas control valve or orifice flow capacity coefficient,
$P_1$ = pressure upstream of the main fuel gas control valve or orifice, and
$G$ = specific gravity of the fuel gas.

2. The method of claim 1 further characterized by:

1. establishing a first signal representative of the specific gravity, G, of said fuel gas:
2. establishing a second signal representative of the pressure $P_1$:
3. functionally relating said first and said second signals in accordance with the equation $q/K = f(P_1,G)$ and
4. adjusting $P_1$ to maintain q/K substantially constant.

3. The method of claim 2 wherein $$C = P_1(G+k)$$

wherein $k$ = an adjustable constant, and
$C = q/K$.

4. A method for preventing upsets in heat input rate to fuel gas-fired equipment wherein the fuel gas fluctuates in heating value and said equipment comprises a burner and a fuel gas feed line containing a main fuel gas control valve or orifice, which comprises adjusting the value of $P_2$ and as required to maintain substantially constant the quantity C in the equation $$C = f(P_2,G)$$

wherein $C = q/K$
$q$ = heat input rate,
$K$ = burner flow capacity coefficient,
$P_2$ = pressure downstream of the main fuel gas control valve or orifice, and
$G$ = specific gravity of the fuel gas.

5. The method of claim 4 further characterized by:

1. establishing a first signal representative of the specific gravity, G, of said fuel gas:
2. establishing a second signal representative of the pressure $P_2$:
3. functionally relating said first and said second signals in accordance with the equation $C = f(P_2,G)$ and
4. adjusting $P_2$ to maintain q/K substantially constant.

6. The method of claim 5 wherein $$C = P_2(G+k)$$

wherein $k$ = an adjustable constant.

7. The method of claim 6 wherein $$k = \frac{G(a_1G+a_2)(2P_2-P_o)}{(a_1G-a_2)(P_2-P_o)} - G$$

wherein $a_1$ and $a_2$ are heating value correlation parameters from the equation:

$$LHV = a_1G+a_2$$

8. A method for preventing upsets in the heat input rate to gas-fired equipment wherein the fuel gas fluctuates in heating value and said equipment comprises a fuel gas feed line comprised of a first and a second portion, said first portion being upstream of said second portion and said first and said second portions being separated by a main fuel gas control valve or orifice, comprising:
1. establishing a first signal representative of the specific gravity, G, of said fuel gas;
2. establishing a second signal representative of the pressure $P_1$ in said fist portion:
3. establishing a third signal representative of the pressure $P_2$ in said second portion:
4. functionally relating the signals G, $P_1$ and $P_2$ in accordance with the equation
$q/K = f(P_1, P_2, G)$
wherein
$q$ = heat input rate,
$K$ = main fuel gas control valve or orifice flow capacity coefficient; and
maintaining said q/K substantially constant.

9. In a fuel gas fired heating system comprising a heater having at least one burner and a fuel gas feed line, and wherein said fuel gas fluctuates in heating value and wherein said fuel gas feed line to said heating system comprises a first and a second portion, said first portion being upstream of said second portion and said first and said second portions being separated by a main fuel gas control valve or orifice, the improvement which comprises:
1. a first means to establish a first signal representative of the specific gravity, G, of said fuel gas;
2. a second means to establish a second signal representative of the pressure $P_1$ in said first portion;
3. a third means to establish a third signal representative of the pressure $P_2$ in said second portion; and
4. a fourth means to
a. functionally relate said first signal, said second signal, and said third signal in accordance with the equation
$q/K = f(P_1, P_2, G)$
wherein
$q$ = heat input rate, and
$K$ = main fuel gas control valve or orifice flow capacity coefficient, and
b. responsive to changes in $P_1$, $P_2$ or G maintain said q/K substnatially constant.

10. The system of claim 9, wherein said fourth means comprises a fuel gas heating value compensator system operating an inlet control valve, said inlet control valve positioned in said fuel gas feed line upstream of the point at which said second means establishes the signal representative of $P_1$.

11. The fuel gas-fired heating system of claim 1 wherein:
1. said first means is a specific gravity sensor and transmitter:
2. said second means is a pressure sensor and transmitter; and
3. said third means is a pressure sensor and transmitter.

12. In a fuel gas fired heating system comprising a heater having at least one burner and a fuel gas feed line, and wherein said fuel gas fluctuates in heating value and wherein said fuel gas feed line to said heating system comprises a line containing a main fuel gas control valve or orifice wherein critical flow is maintained, the improvement comprising:
1. a first means to establish a first signal representative of the specific gravity, G, of said fuel gas;
2. a second means to establish a second signal representative of the pressure $P_1$ in said line upstream of said main fuel gas control valve or orifice;
3. a third means to
a. functionally relate said first signal and said second signal in accordance with the equation
$q/K = f(P_1, G)$
wherein
$q$ = heat input rate, and
$K$ = main fuel gas control valve flow capacity coefficient, and
b. responsive to changes in $P_1$ or G maintain said q/K substantially constant.

13. The system of claim 12 wherein said third means comprises a fuel gas heating value compensator system operating an inlet control valve, said inlet control valve positioned in said fuel gas feed line upstream of the point at which said second means establishes said signal representative of $P_1$, and said inlet control valve is operated by said fuel gas heating value compensator system to adjust $P_1$ responsive to changes in G.

14. The fuel gas fired heating system of claim 13 wherein $q/C_a K' = P_1 (G+B/A)$,
$K'$ = a constant,
$C_a$ = main fuel gas control value or orifice flow coefficient for critical flow,
$B$ = a constant, and
$A$ = a constant.

15. The fuel gas fired heating system of claim 14 wherein:
1. said first means is a specific gravity sensor and transmitter; and
2. said second means is a pressure sensor and transmitter.

16. A fuel gas fired heating system wherein the fuel gas fluctuates in heating value, comprising a heater having at least one burner and a fuel gas feed line, and wherein said fuel gas feed line to said heating system comprises a first and a second portion, said first portion being upstream of said second portion and said first and said second portions being separated by a main fuel gas control valve or orifice, and a control system which comprises:
1. a first means to establish a first signal representative of the specific gravity, G, of said fuel gas:
2. a second means to establish a second signal representative of the pressure $P_2$ in said second portion;
3. a third means to
a. functionally relate said first signal and said second signal in accordance with the equation
$C = f(P_2, G)$
wherein
$C = q/K_2$,
q = heat input rate, and
$K_2$ = burner flow capacity coefficient, and
(b) responsive to changes in $P_2$ or G maintain said C substantially constant.

17. The fuel gas-fired heating system of claim 8 wherein:
$C = P_2 (G+k)$
wherein $k$ = an adjustable constant.

18. The fuel gas-fired heating system of claim 17 wherein:

$$k = \frac{G(a_1G+a_2)(2P_2-P_o)}{(a_1G-a_2)(P_2-P_o)} - G$$

wherein
$a_1$ and $a_2$ are heating value correlation parameters from the equation:
$LHV = a_1G+a_2$
and
$LHV$ = fuel gas heating value of the gas having the specific gravity, $G$:
$P_o$ = the pressure inside the heater.

19. A fuel gas fired heating system wherein the fuel gas fluctuates in heating value, comprising a heater having at least one burner and a fuel gas feed line, and wherein said fuel gas feed line to said heating system comprises a first and a second portion, said first portion being upstream of said second portion and said first and said second portions being separated by a main fuel gas control valve or orifice, and a control system which comprises:
1. a first means to establish a first signal representative of the specific gravity, $G$, of said fuel gas;
2. a second means to establish a second signal representative of the pressure $P_1$ in said first portion;
3. a third means to
   a. functionally relate said first signal and said second signal in accordance with the equation
   $C = f(P_1,G)$
   wherein
   $C = q/K_2$,
   $q$ = heat input rate, and
   $K_2$ = main fuel gas control value flow capacity coefficient, and
   b. responsive to changes in $P_1$ or $G$ maintain said $C$ substantially constant.

20. The system of claim 11 further comprised of an inlet control valve positioned in said fuel gas feed line upstream of the point at which said second means establishes the signal representative of $P_1$, and wherein said third means comprises a fuel gas heating value compensator system operating said inlet control valve to adjust $P_1$ responsive to changes in $G$.

21. The fuel gas fired heating system of claim 12 wherein:
$C = P_1(G+k)$
wherein $k$ = an adjustable constant.

* * * * *

UNITED STATES PATENT AND TRADEMARK OFFICE
CERTIFICATE OF CORRECTION

PATENT NO. : 3,894,832
DATED : July 15, 1975
INVENTOR(S) : Thomas G. Chin & Ronald C. Sorensen It is certified that error appears in the above-identified patent and that said Letters Patent are hereby corrected as shown below:

Title Page under Abstract, "q/k = f(P,G)" should read --q/K = f(P,G)--.

Col. 3, line 33, "(FIGS. 2-6)" should read --(FIGS. 2-5)--.
Col. 4, line 50, "520/T," should read -- $\sqrt{520/T}$, --.
Col. 4, line 60, "520/GT" should read -- $\sqrt{520/GT}$ --.
Col. 4, line 62, "520/GT" should read -- $\sqrt{520/GT}$ --.
Col. 4, line 65, "520/GT" should read -- $\sqrt{520/GT}$ --.
Col. 4, line 67, "520/GT" should read -- $\sqrt{520/GT}$ --.
Col. 5, line 2, "G" should read -- $\sqrt{G}$ --.
Col. 5, line 50, "G" should read -- $\sqrt{G}$ --.

Col. 7, line 1, " $\sqrt{\frac{C}{[G+K]} [\frac{C}{G+K} - P_o]}$ " should read

-- $\sqrt{\frac{C}{[G+K]} [\frac{C}{G+K} - P_o]}$ --.

Col. 7, line 53, "after" should read --<u>after</u>--.
Col. 9, line 61, "Cgo" should read --$C_{g_o}$--.
Col. 9, line 66, "Cg" should read --$C_g$--.
Col. 10, line 1, "Fuel gas: LHV vs. G  LHV = 1410G + 10  Refer to Eq. 19"

should read --Fuel gas: LHV vs. G

LHV = 1410 G + 10  Refer to Eq. 19--.

Col. 10, line 20, "60" should not be bold face.

UNITED STATES PATENT AND TRADEMARK OFFICE
CERTIFICATE OF CORRECTION

PATENT NO. : 3,894,832
DATED : July 15, 1975
INVENTOR(S) : Thomas G. Chin & Ronald C. Sorensen It is certified that error appears in the above-identified patent and that said Letters Patent are hereby corrected as shown below:

Col. 10, line 25, "$P_1 = \dfrac{85.7195496}{(G + 0.7286591597)}$ Eq. A" should read -- $P_1 = \dfrac{85.7195496}{(G + 0.7286591597)}$ Eq. A --.

Col. 12, lines 58-60, "$P_2 = 14.5 - 1.856818183\ P_1 + \sqrt{(1.856818183\ P_1 - 145.5)^2 + 4(1.856818183 P_1^2)}$ should read $P_2 = 14.5 - \dfrac{1.856818183\ P_1}{2} + \dfrac{\sqrt{(1.856818183\ P_1 - 145.5)^2 + 4(1.856818183 P_1^2)}}{2}$ Eq. D --.

Col. 13, Claim 1, lines 56-57, "of at least $P_1$" should read --of $P_1$--.

Col. 14, Claim 4, line 36, "$P_2$ and as required" should read --$P_2$ as required--.

Col. 15, Claim 8, line 12, "fist" should read --first--.

Col. 15, Claim 9, line 48, "substnatially" should read --substantially--.

UNITED STATES PATENT AND TRADEMARK OFFICE
CERTIFICATE OF CORRECTION

PATENT NO. : 3,894,832
DATED : July 15, 1975
INVENTOR(S) : Thomas G. Chin & Ronald C. Sorensen It is certified that error appears in the above-identified patent and that said Letters Patent are hereby corrected as shown below:

Col. 16, Claim 17, line 1, "8" should read --16--.
Col. 18, Claim 20, line 1, "11" should read --19--.
Col. 18, Claim 21, line 1, "12" should read --20--.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*